G. M. Peters.
Harvester Rake.
No. 66625     Fig. 1.     Patented Jul. 9, 1867.
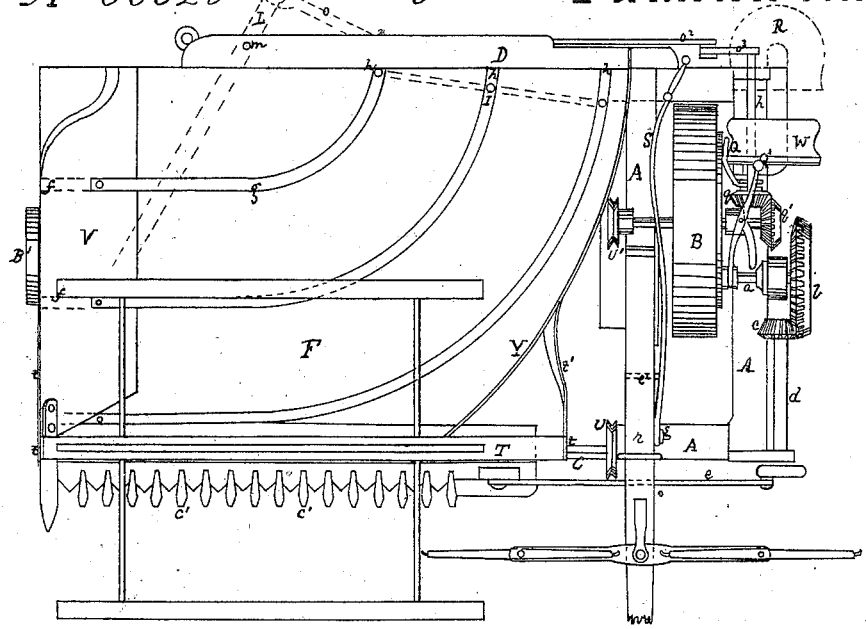
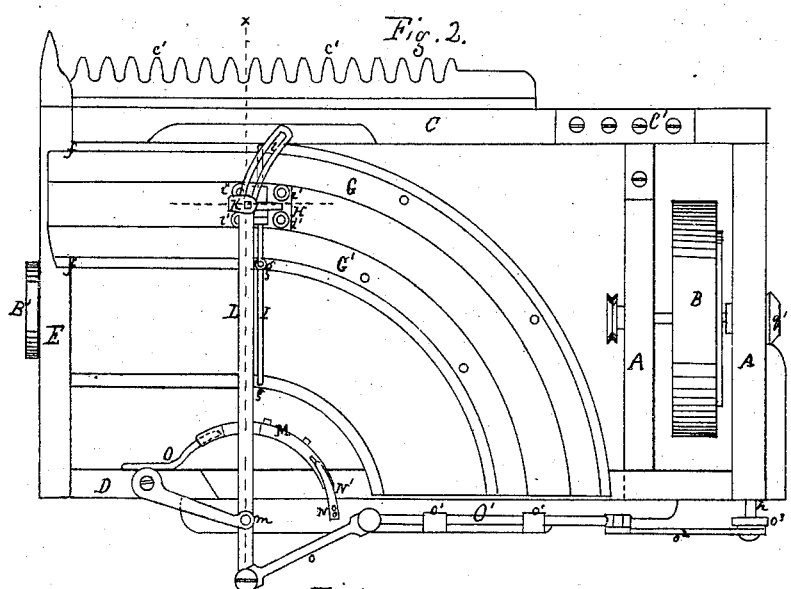
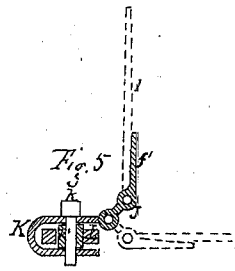
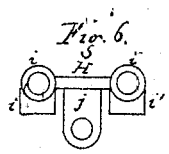
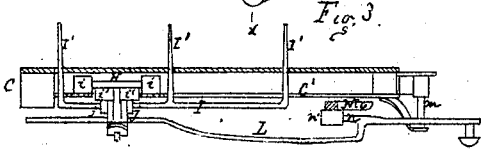
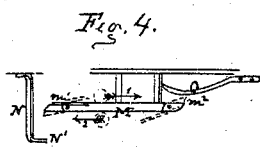
Witnesses.
Inventor.
G. M. Peters
by his atty
Addison M. Smith

United States Patent Office.

G. M. PETERS, OF GRANVILLE, OHIO.

Letters Patent No. 66,625, dated July 9, 1867.

---

IMPROVEMENT IN HARVESTER-RAKES.

---

The Schedule referred to in these Letters Patent and making part of the same.

---

TO ALL WHOM IT MAY CONCERN:

Be it known that I, G. M. PETERS, of Granville, county of Licking, and State of Ohio, have invented a new and useful Improvement in Rakes for Harvesters; and I do hereby declare that the following is a full, clear, and exact description of the construction and operation of the same, reference being had to the annexed drawings, making a part of this specification, in which—

Figure 1 is a plan or top view of a harvesting machine embracing my improvements.

Figure 2 is a bottom view thereof.

Figure 3 is a sectional view of the same, taken in line $x\ x$, fig. 2.

Figure 4 is a detached view, showing the guide-rod, weighted latches, &c., for governing the movements of the rake-lever, and Figures 5 and 6 are also detached views, hereinafter explained.

Similar letters of reference indicate corresponding parts in all the figures.

My invention consists in the employment of a reciprocating and turning-rake operating from beneath, through a slotted platform, and so arranged as to sweep the grain from the platform of the machine in a path which is parallel with the finger-bar in a portion of its length, and then to turn in the arc of a circle and discharge the grain behind the inner end of the platform, out of the way of the team and machine on its next round, as hereinafter explained; and it further consists in a novel arrangement of means for operating the rake in the manner above explained.

To enable others to understand and use my invention, I will describe the same with reference to the drawings, in which—

A is the main frame of the machine. B the main carrying and driving-wheel, provided with the usual spur-gear, and from which motion is imparted to the cutter through a pinion on the end of counter-shaft $a$, driving bevel-gears $b\ c$, crank-shaft $d$, and pitman $e$, as shown in the drawings, or in any desired manner. C is the finger-bar, bolted or otherwise firmly secured to frame A in line or nearly in line with the front transverse bar of frame, as shown at $C'$, and to which the guard-fingers $c'$ are connected in the usual manner. D is a bar attached to the rear of the main frame, and arranged in a line parallel or nearly so to the finger-bar, and connected at its outer end to the outer or frame end of the finger-bar by the longitudinal bar or frame-piece E, the bars C, D and E forming, in connection with inner longitudinal bar of frame A, the frame for the support of the grain platform and raking apparatus, hereinafter described. F is the platform, which may be made of sheet metal or other suitable material, slotted in a portion of its length, in lines parallel with the finger-bar, as shown in the drawing, at points therein marked $f\ g$, from which latter point, $g$, the slots are formed in the arc of a circle, of which the point or pivot $m$, hereinafter referred to, is the centre, and terminate at the frame bar D, at the inner rear corner of the platform, as shown at $h$. G G' are curved strips or plates of metal, of a form corresponding to the form or curvature of the slots in the platform, and secured to the platform by means of shouldered bolts or rivets, at a suitable distance beneath the same to accommodate a reciprocating carriage, H, moving on friction-roller $i$, between the said guides and the platform, as shown in fig. 3. The carriage is further provided with friction-rollers $i'$ attached to its under surface and working over the opposing faces of the guides G G', as shown in figs. 2 and 3. I is the rake-head, provided with teeth I', which, when the rake is discharging the grain, pass up through the slots in the platform, (see fig. 3.) Said rake-head is supported in lugs $j$, underneath the carriage H, in such manner as to be free to turn thereon, (see figs. 3 and 6.) J is a crank-arm or lever, secured to the rake-head in such manner as to cause the rake-head to turn with it. Said arm is provided with an arm or stop, $j'$, which, when the rake-teeth are raised to discharge the grain, strikes against the carriage H, and prevents said teeth from passing beyond a vertical position. The opposite end of arm or lever J is provided with an eye to receive a pivot passing through corresponding eyes in one leg or arm of loop K, as shown in fig. 5. L is a slotted lever, which passes through the loop K, and is connected thereto by means of pin $k$, provided with friction-roller $k'$, which works back and forth in the curved slot $l$, in lever L, as hereinafter explained. Lever L is constructed in form shown in figs. 2 and 3, and is pivoted at the rear and near the outer corner of the platform, on the elongated pivot or fulcrum pin $m$, and is provided with a spur, $n$, having a friction-roller, $n'$, which works over and under a curved horizontal guide, M, on the opposite ends of which are weighted or spring latches or gates, $m^1$ $m^2$, for permitting and controlling the vertical movements of levers L. N is a pendant connected to the under side of the platform or to rear bar D, and provided with an angular arm or inclined way N', over which the roller $n'$ passes, and by which the rake-lever L is raised in passing the latch $m^1$. O is a curved arm or way attached to the platform at the opposite end of guide-way or track M, underneath which the roller passes at or near the end of its return movement, and by which a downward movement is given to the rake-lever in passing gate $m^2$, for a purpose hereinafter explained. The lever L extends in rear of its fulcrum pin $m$, and is connected, at its rear end, by link or pitman $o$, to one end of reciprocating rod or bar O', sliding in bearings or lugs, $o^1$ $o^1$. Said rod is connected by link or pitman $o^2$ to crank-arm $o^3$, on one end of shaft $p$, which is mounted in bearings on the main frame, and which is provided at its opposite end with the bevel-wheel $q$, which meshes with the bevel-wheel $q'$ on the end of the main drive-wheel axle, as shown in figs. 1 and 2. Q is a forked-lever, arranged within convenient reach of the driver, on seat R, for the purpose of enabling him to slide the bevel-gear $q$ on its shaft $p$, into or out of gear with bevel-gear $q'$. Q' is a similar lever, also located within convenient reach of the driver, for sliding the pinion on the counter-shaft, and thereby throwing it into and out of gear with its driving spur-wheel for stopping or starting the cutters. B' is the grain-wheel, carrying the outer or grain end of the platform, arranged in line with the driving-wheel, and in such relation to the platform as to support the outer end at the same height from the ground as the inner end. S is a curved lever, pivoted to the tongue $r$ at $r'$, and connected at its forward end by a chain or link, $s$, to the finger-bar or frame A. Said lever extends back into a position convenient to be operated by the driver on seat R. T is the reel, mounted in standards $t$ $t'$, as shown in fig. 1, and provided, at the inner end of its shaft, with pulley U, to which motion is imparted by a belt from pulley U' on the inner end of the main axle, or in any usual or convenient manner. V is an inclined slotted grain-guard or deflector at the grain end of the machine, by which the grain cut by the outer end of the cutting apparatus is thrown inward toward the centre of the platform, and which is of sufficient width to enable the teeth to be raised to the vertical position before coming in contact with the grain on the platform. W is a foot-board, which may be either attached to the seat standard or to the main frame in any convenient manner.

The operation of the cutting apparatus, reel, shifting-levers, &c., will be understood without further description.

The operation of the rake is as follows, viz: The machine being drawn forward in the usual manner, motion is imparted from bevel-wheel $q'$ to bevel-wheel $q$ on shaft $p$, and crank $o^3$, and through pitman $o^2$, reciprocating rod O', and pitman $o$, to the rake-lever L. The parts being in position shown in fig. 1, in which the rake has just completed the discharge of a gavel, the roller $n'$, on spur $n$ of the rake-lever, is caused by the rotation of the crank $o^3$ to move outward over the horizontal track or way M, in position and direction shown by dotted lines and arrow 1, fig. 4, until it reaches the curved rod or guide O, underneath which it passes, forcing the weighted latch $m^2$ down with it, when, having passed the latch, the latter resumes its former position shown in dotted lines, fig. 4, when the rake-arm, having reached the end of its ineffective stroke, commences its return movement, and the roller $n'$ being forced underneath the way M, by the position of the latch, causes a downward reciprocation of the lever, carrying the end of arm or lever J, attached thereto, down with it, thereby turning the rake-head to which lever J is attached, and causing the teeth to assume a vertical position, as shown in figs. 3 and 5, for sweeping or discharging the grain off the platform, the roller $n'$ passing back underneath the track M, as shown by dotted lines and arrow 2, fig. 4. The rake-lever turning upon a fixed point, the vibration of the rake end is in the arc of a circle, of which the fulcrum pin $m$ is the centre, but, the path or way in which the rake-carriage moves, being for a portion of its length in a path parallel with the finger-bar, the pin connecting said carriage to the rake-lever is permitted to move freely back and forth in the slot in the outer curved end of the lever, to compensate for the varying distance of the rake-carriage from the fulcrum $m$. When the rake has nearly reached the end of its delivery stroke the roller $n'$ is caused to rise over the inclined track N' on pendant N, carrying the weighted latch $m^1$ with it until it passes said latch, when the rake, having completed its delivery stroke, the rake-arm is lifted by roller $n'$, passing back over the latch, carrying that end of lever J with it, thereby turning the teeth downward into a horizontal position out of the way of the grain lying on the platform. Y is a grain-board at the inner end of the cutting appartus and platform, conforming in shape nearly to the curved path of the rake during the latter part of its movement in discharging the grain, and which serves to prevent the scattering of the grain during the operation of discharging the same.

I have now described one good practical way in which my invention may be carried out in practice, but it will be obvious that changes may be made, as in the construction of the frame, the employment of two driving-wheels instead of the one described, and of the specific devices through which motion is communicated to the rake, without departing from my invention.

What I claim as my invention, is—

1. A reciprocating and turning-rake, operated from beneath, through a slotted platform, and arranged to move in a path parallel with the finger-bar during a part of its delivery stroke, and then to turn and sweep the grain from the platform in the arc of a circle, the centre of which is at or near the rear outer corner of said platform, substantially as described.

2. A grain-platform, slotted as described, in combination with a reciprocating and turning-rake operating from underneath, and delivering the grain in rear of the inner or main frame-end of said platform, substantially as described.

3. The reciprocating turning rake, in combination with the lever J and slotted sliding-lever L, operated as described.

4. The reciprocating rod O', working underneath the rear edge of the platform in guides $o^1 o^1$, in combination with connecting rods or links $o\ o^2$, and slotted lever L, as described.

5. The rake-lever L provided with the spur and friction-roller as described, whereby a vertical reciprocation is imparted to said rake-lever through the medium of ways or tracks M N O, and latches $m^1 m^2$, or their equivalents for the purpose specified.

In testimony whereof I have hereunto set my hand this twenty-third day of April, 1867.

G. M. PETERS.

Witnesses:
JONATHAN REES,
JAMES L. COX, Jr.